United States Patent
Quayle et al.

(10) Patent No.: US 12,406,118 B1
(45) Date of Patent: Sep. 2, 2025

(54) SYSTEM AND METHOD FOR MANAGING SERIAL LANES IN A MULTI-USER EMULATION SYSTEM

(71) Applicant: Cadence Design Systems, Inc., San Jose, CA (US)

(72) Inventors: Barton L. Quayle, San Jose, CA (US); Chi Ming Yeung, Dublin, CA (US); Choshu Ito, San Mateo, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 948 days.

(21) Appl. No.: 17/536,559

(22) Filed: Nov. 29, 2021

(51) Int. Cl.
*G06F 30/3308* (2020.01)
*G06F 111/02* (2020.01)
*G06F 111/20* (2020.01)

(52) U.S. Cl.
CPC ...... *G06F 30/3308* (2020.01); *G06F 2111/02* (2020.01); *G06F 2111/20* (2020.01)

(58) Field of Classification Search
None
See application file for complete search history.

(56) References Cited

U.S. PATENT DOCUMENTS

| | | | |
|---|---|---|---|
| 6,473,726 B1 * | 10/2002 | Reblewski | G06F 30/331 716/117 |
| 9,379,846 B1 * | 6/2016 | Poplack | H04L 1/0041 |
| 10,198,538 B1 * | 2/2019 | Quayle | G06F 30/331 |
| 2002/0007479 A1 * | 1/2002 | Funakura | G01R 31/31908 716/136 |
| 2013/0097455 A1 * | 4/2013 | Chang | G06F 11/0724 714/3 |

* cited by examiner

*Primary Examiner* — Emerson C Puente
*Assistant Examiner* — Michael Paul Mirabito
(74) *Attorney, Agent, or Firm* — Mark H. Whittenberger; Holland & Knight LLP

(57) ABSTRACT

Embodiments include herein are directed towards a system and method for circuit emulation. Embodiments may include one or more domains of system components, each respective domain comprising one or more processors of the emulation system. Each respective processor may be configured to execute one or more processing jobs according to an instruction set executed by the respective processor. Embodiments may include a system manager module configured to control an emulation associated with a first domain and identify at least one unused pin associated with the first domain. The system manager module may be configured to allow access to the at least one unused pin for a second domain during the emulation of the first design.

16 Claims, 17 Drawing Sheets

800

SYSTEM AND METHOD FOR MANAGING SERIAL LANES IN A MULTI-USER EMULATION SYSTEM

FIELD OF THE INVENTION

The present disclosure relates generally to processor-based hardware verification systems. More particularly, the present disclosure relates to a system for managing serial lanes in an emulation system.

BACKGROUND

Emulation systems may comprise hardware components, such as emulation chips and processors, capable of processor-based (e.g., hardware-based) emulation of logic systems, such as integrated circuits (ICs), application specific integrated circuits (ASICs), central processing units (CPUs), graphics processing units (GPU), field-programmable gate arrays (FPGAs), and the like. By executing various forms of programmable logic, the emulation chips may be programmed to mimic the functionality of nearly any prototype logic system design that is undergoing testing. Processor-based emulation allows logic system designers to prototype a logic system's design, before a manufacturer expends resources manufacturing a logic system product based on the design.

After emulation system customers or users (e.g., logic system designers) submit their design for emulation from their computing devices, the users may logically and/or physically attach to the emulator system a hardware target device, such as a target pod, which communicates data signals regarding to the ongoing emulation. In the past, target connections have always been statically tied to specific domains of the emulator system, which are predefined collections of system resources assigned to execute an emulation. But when an assigned domain was in use for another processing job or was otherwise unavailable, the target could neither transmit input signals to the emulator system, nor receive outputs from the emulator system. In sum, even though a problem would be isolated to just one or more domains of the emulation system, the emulator system would be rendered altogether unavailable to the target. Thus, one user could not test their logic system design, while others could, and while other portions of the emulation system were still operational or otherwise available.

Ultimately, the practical effect of this shortcoming is underutilization, or less-than-optimal use of the emulator system and its components. For instance, the workload of busy domains cannot be shifted to available domains. In addition, the static relationships between domains and target connections often make it difficult to debug problems with the targets and the logic system being tested, because it can be difficult to locate where problems exist—e.g., determining whether poor performance lies with the design of the logic system being tested or the hosting test bench components of the emulation system.

SUMMARY

In one or more embodiments of the present disclosure, a computer-implemented method for use with a multi-user emulation system is provided. The method may include providing a plurality of emulation chips having at least one serializer/deserializer ("SERDES") interconnect therebetween. The method may further include emulating, using at least one of the plurality of emulation chips associated with a first domain, a first design and identifying at least one unused pin associated with the first domain. The method may also include allowing access to the at least one unused pin for a second domain during the emulating of the first design.

One or more of the following features may be included. In some embodiments, the method may include simultaneously emulating a second design and the first design. The method may further include recognizing the second domain having at least one additional SERDES interconnect associated therewith. The method may also include testing the at least one additional SERDES interconnect prior to emulating the second design. The method may further include providing the first domain with access to the plurality of SERDES interconnects associated with the second domain. The method may include directly mapping register access to the at least one SERDES interconnect without using a page register. The method may also include automatically asserting a macro level reset on the at least one SERDES interconnect. Recognizing the second domain may include identifying at least one board has been activated. The method may also include performing system maintenance during the emulating of the first design. One or more register blocks for each of the at least one SERDES interconnect may be separated.

In one or more embodiments of the present disclosure a system and method for circuit emulation is provided. The system may include one or more domains of system components, each respective domain comprising one or more processors of the emulation system. Each respective processor may be configured to execute one or more processing jobs according to an instruction set executed by the respective processor. The system may further include a system manager module configured to control an emulation associated with a first domain and identify at least one unused pin associated with the first domain. The system manager module may be configured to allow access to the at least one unused pin for a second domain during the emulation of the first design.

One or more of the following features may be included. In some embodiments, the system manager module may be further configured to simultaneously emulate a second design and the first design. The system manager module may be further configured to recognize the second domain having at least one additional SERDES interconnect associated therewith. The system manager module may be further configured to test the at least one additional SERDES interconnect prior to emulating the second design. The system manager module may be further configured to provide the first domain with access to the plurality of SERDES interconnects associated with the second domain. The system manager module may be further configured to directly map register access to the at least one SERDES interconnect without using a page register. The system manager module may be further configured to automatically assert a macro level reset on the at least one SERDES interconnect. Recognizing the second domain may include identifying at least one board has been activated. The system manager module may be further configured to perform system maintenance during the emulating of the first design. One or more register blocks for each of the at least one SERDES interconnect may be separated.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
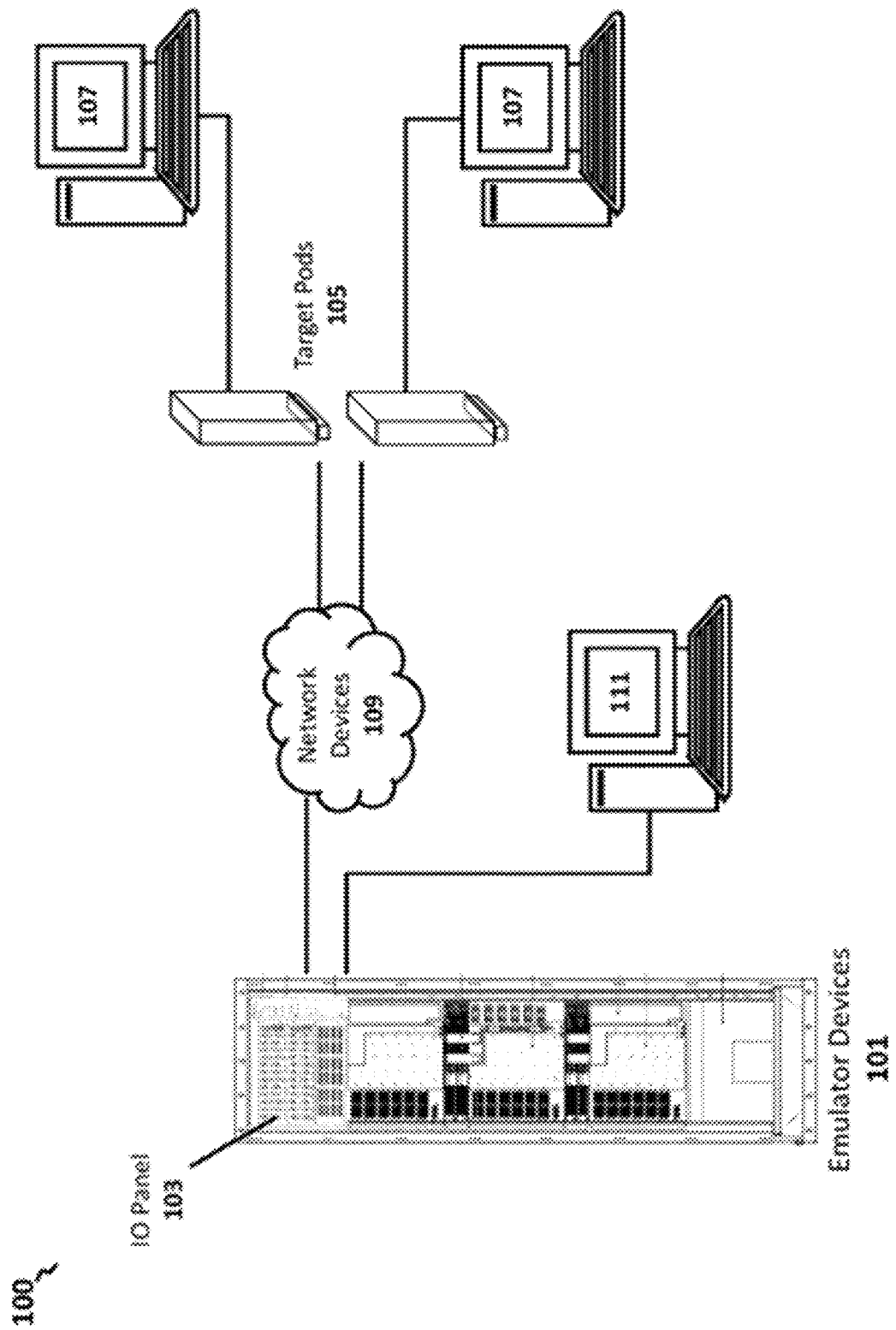
FIG. 1 shows components of an emulation system, according to an exemplary system embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

In emulation systems, interconnection lanes may be distributed across hundreds of the emulation chips in the system, since the design goal for an emulator is to connect directly to as many chips as possible. This minimizes the additional latency of passing through an intermediate chip (and the use of precious interconnects).

SERDES interconnects may be used to significantly reduce pin-count and increase the available I/O bandwidth for pin-limited emulation chips and board connectors. Emulation often may require a very light-weight protocol with minimal overhead and minimal latency, which implies out-of-band link management. Emulation SERDES also need to be error-free, because "resending" may not be possible. Light-weight, low-latency serial lanes require complex initialization, tuning, and test after power-up and prior to use. The result is that any individual drawer maintenance takes most or all of the system offline to reinitialize, tune, and test the interconnect, since it connects to many or all of the other boards in the system. Since the system is multi-user, any solution must be independent of running jobs. Most systems today, simply take the system offline and initialize and test the interconnect at power-up. It is possible to test some of the lanes (e.g., free and test a first set of domains) and then test a second group of lanes (e.g., release the first and free a second set of domains), but this still requires one set or the other to be offline and generally takes twice as long (testing time varies only slightly with the number of lanes being tested). The result is that any individual drawer maintenance still takes most or all of the system offline to reinitialize and test the interconnect, as it connects to many or all of the other boards in the system. Embodiments discussed in further detail hereinbelow address many of these deficiencies.

FIG. 1 shows components of an exemplary emulation system 100, according to an exemplary embodiment. The system 100 may comprise any number of emulation devices 101 that are configured to emulate logic systems (e.g., ASIC, FPGA, GPU, CPU, etc.) in order to test the design of those logic systems. The emulation system 100 may further comprise any number of target systems (e.g., target pods 105, client devices 107) that may be directly coupled to the emulator devices 101 or may be indirectly coupled to the emulator devices 101 via any number of network devices 109. In some cases, an administrative computer 111 may be coupled directly or indirectly to the emulator devices to control aspects of how emulator devices execute.

FIG. 1 illustrates relationships between various components of system 100, including emulator devices 101 and target pods 105, as being physically and logically organized into one or more cabinets or housings. However, it should be appreciated that there is no requirement for any components of an emulation system 100 to be logically or physically organized into such containers. Rather, the emulator devices 101 may be logically and physically organized within the same or different devices or structures, and may be distributed across any number of physical structures and locations (e.g., cabinets, rooms, buildings, cities).

Emulator Devices

Emulator devices 101 may be devices of an emulation system 100 responsible for compiling and executing emulation routines. Non-limiting examples of emulation devices 101 may include emulation chips, logic boards, data buses, wiring interfaces, data lanes, non-transitory machine-readable media, and processors, among others. The emulator devices 101, such as emulation chips, may be preprogrammed to process data inputs and generate data outputs according to instructions generated by compiling a schematic design ("netlist") of a particular logic system. A processor of the emulation system 100 may programmatically compile a machine-readable netlist file into executable code, which is then distributed as instruction sets to one or more emulation chips of the system. For each of the components of the system 100 receiving an instruction set, the instructions indicate which other component of the system 100 is the source of a particular component's next data input, and which other component of the system 100 is the destination of the particular component's next data output.

The emulator devices 101 may be logically organized into domains, which are subsets of the emulation devices 101 allocated to execute a particular emulation. Domains may be the smallest unit of hardware resources of the emulator devices 101 that the emulation system 100 is capable of allocating to emulate a logic system design associated with a target system. Each domain may comprise one or more emulation devices 101 allocated by a configuration module to execute a particular emulation routine, in order to emulate a logic system design of a target system. A domain (e.g., set of hardware resources) may be configured with execution parameters independent from both other domains and the rest of an emulation system 100 as whole. For example, each domain may comprise a separate execution clock that is independent from a system clock, and thus the domain may be independently schedulable from a user's perspective. It should be appreciated that a domain may be defined at any level of granularity within the system, and may comprise any collection of hardware resources of the emulation system 100. Non-limiting examples of what constitutes a domain may include, but is not limited to: one or more emulation chips, one or more processors on emulation chips, logical circuit boards, clusters of logical circuit boards, and any other collection hardware components that may be allocated to execute according to an independent clock. Without limiting the scope of what constitutes a domain, and for ease of discussion, domains, as used herein, may comprise one or more emulation chips.

Generally, after one or more domains are allocated to emulate a design submitted for a target system, the components of a particular allocated domain may be configured to communicate data to and from the devices of the allocated target system. Accordingly, at least one of the allocated domains may be directly coupled (via an I/O panel 103) or indirectly coupled (via various network devices 109) to a device of the respective target system, such as a target pod 105, so that the devices may communicate data related to emulation routines. Domains and target pods 105 may be indirectly coupled as result of instruction sets compiled by a compiler using a netlist file and subsequently provided to the respective emulation chips of the allocated domain. The executable instructions of an instruction set instructs an emulation chip that the emulation chip should receive data inputs and instructions from the respective target pod 105 and that the emulation chip should likewise transmit data outputs to the target pod 105. The target pod 105 may receive and store the data outputted by the associated emulation chip (e.g., domain) and may then make the data available to a client computing device 107 for user or administrator review.

A domain may be allocated to, and associated with, a target pod 105 by a configuration manager. The configuration manager may be one or more software modules executed by the emulation devices 101, and configured to manage allocation of system resources and the execution of emulation routines. In some cases, an administrator or an end-user of the emulation system 100 may interact with the configuration manager to in order to provide user inputs indicating that one or more domains of the system 100 should be allocated to execute a particular emulation, from a respective target system. Additionally or alternatively, in some cases, the configuration manager may automatically determine which domain should be allocated to execute a particular emulation. In such cases, the configuration manager may detect and identify domains that are available (e.g., functional, not busy), but may also make the determination based on any number of optional criteria. For example, the configuration manager may determine which of the available domains to allocate to an emulation and respective target pod 105 based on, for example, the most efficient domain given the processing demands of the emulation, the most effective domain given the processing demands of the emulation, and the physically closest domain to the target pod 105, among other possible criteria.

Target Systems

Target systems (e.g., target pods 105, client devices 107) may include one or more computing devices configured to send and receive instructions and data values driving execution of emulation routines by emulator devices 101. A target system may be configured to host an operating environment, or at least aspects of the operating environment, where the logic system (e.g., ASIC, CPU, GPU, etc.) currently being tested will ultimately be installed. As shown in FIG. 1, a target system may include a target pod 105 coupled to a client device 107. However, it should be appreciated that a target system may comprise any number of devices required to complete the emulation routines. Target Systems may comprise circuitry, software, firmware, and/or any number of devices that connect and interact with emulator devices 101 on behalf of users (e.g., provide test signals to an emulator executing a compiled netlist). Design netlists may be generated and compiled in order to appropriately connect and direct data values between the emulation devices 101 to the target system. The connections and interactions between a target system and the emulator devices 101 may be established and supported via target pods 105, or any other electronic device capable of performing the same or similar functions of a target pod 105 as described herein.

In operation, a target pod 105 may transmit instructions and values to the emulator devices 101, which, in turn, execute the instructions received from the target pod 105 or uses the values as inputs to execute preprogrammed processes, in order to emulate the functions of the particular logic system being tested. After the emulation system 100 executes preprogrammed instructions and/or any instructions received from the target pod 105, the emulation system 100 may then generate instructions and/or output data values, which the emulation system 100 then transmits to the target pod 105. As mentioned, the target pod 105 may comprise machine-readable memory configured to store the various data outputs produced by the emulation system 100, after the emulation system 100 executes the various processes that emulate the behavior of the logic system being tested. The results are output to a user interface of a client computing device 107, which executes various software modules associated with the emulation system 100. In addition, the client computing device 107 may provide an end user with various customization or management features, so that an end user may configure various aspects of the emulation and the emulation routines. For example, a user may employ the client device 107 to submit a netlist file containing a representation of the features of the logic system design being tested, to a compiler module executed by the emulator devices 101. The resulting binary code, produced from the compiled netlist file, may then be used to configure certain emulator devices 101 to execute the various emulation routines of the compiled netlist.

A target pod 105 may be any computing device comprising a processor that executes various preprogrammed processes intended to test a logic system design, and/or non-transitory machine-readable storage media that stores various data inputs and outputs produced by the target pod 105 or received from the emulation system 100. That is, the target pods 105 may generate computing instructions and/or values that test the functions and quality of the logic system design. It should be appreciated that a target pod 105 may be a distinct, standalone device, as shown in FIG. 1, but a target pod 105 may also be integrated into another computing device that is in communication with various other components of the emulation system 100. For example, in some cases the client computer 107 may also be a target pod 105. A target pod 105 may be automatically programmed by software modules executed by the emulator devices 101, such as configuration software modules, but may also be manually programmed and managed by a user or administrator, using a user interface program provided at an I/O panel 103, a client computer 107, and/or an administrative computer 111.

The target pods 105 may be coupled to the emulator devices 101 through an I/O interface panel 103 using one or more interface protocols and hardware (e.g., communication cable assemblies) capable of supporting communication between a target pod 105 and the emulator devices 101, including Infiniband, Ethernet, PCI, optics, and the like. The target pod 105 may connect to the I/O panel 103 through any number of cables and/or network devices 109, such as an Ethernet cable and an optical cable. The target pod 105 may plug directly into a client computer 107, through any number of ports of the client computer 107 (e.g., USB, Serial, PCI); or the target pod 105 may be connected indirectly to a target system via one or more connector adapters, data processors, network devices 109, or other electronic communications devices. In some cases, target pods 105 may be proximate to the emulator devices 101, and may therefore communicate through the I/O panel 103 using, for example, a PCI bus. For example, the emulator devices 101 may often be located within the same physical housing (e.g., cabinet, server rack) or proximate physical structures, allowing the emulator devices 101 to communicate via high-speed communication protocols, such as one or more PCI buses. In this example, the target pod 105 may share the physical structure or may be proximately located to the structure, and thus may take advantage of the same or similar high-speed protocols, like the PCI buses. But in some embodiments, a target pod 105 may be located outside of such a physical structure containing the emulator devices 101, or the target pod may be outside the proximity of the physical structure (e.g., different room, floor, building), which means there is no PCI interface capable of linking the target pod 105 to the rest of the emulation devices 101. In such embodiments, communication between the emulation devices 101 and the target pod 105 may occur through any number of networking devices 109, using any number of computer networking-related interfaces and protocols. For example, communication between the emulation system 100 and the target pod 105 may be performed through Ethernet, Infiniband, optical fiber, and the like.

Computing Devices

A client computing device 107 may be used for controlling or otherwise managing various aspects of the emulation system 100, such as submitting a netlist design file for a new or updated logic system design that a user wants to test through emulation. The client computing device 107 may be logically internal or external to a computer network containing one or more emulator devices 101. For example, the client computing device may be logically outside of a firewall functioning as a gateway to the network of the emulator devices 101. The client computing device 107 may be any computing device capable of performing the various tasks and process described herein, such as configuring components of the emulation system 100 (e.g., netlists, chips, processors, logic boards, configuration manager) to emulate the particular logical system (e.g., ASIC, CPU, GPU) being tested. Non-limiting examples of the client computing device 107 may include a workstation computer, a laptop computer, a tablet device, a server computer, and the like. In some cases, the client computing device 107 may be proximate to the emulator devices 101, and may therefore be coupled to the emulator devices 101 through an I/O panel 103 using, for example, an Infiniband connection. In some cases, the client computing device 107 may not be proximate to the emulator device 101, or may be logically external to a computer network hosting the emulator devices 101 (e.g., outside of a firewall). In such cases, the client computing device 107 may be connected to the emulator devices 101 through an I/O panel 103 using, for example, an Ethernet connection. Additionally or alternatively, in some instances, the client computing device 107 may be integrated into the emulator devices 101 and/or I/O panel 103, thereby forming a single device for emulating logic system designs.

An administrative computer 111 may be used by a system administrator or an end-user to manage the emulator devices 101, and to configure aspects of emulation routines. The administrative computer 111 may be any computing device comprising a processor that executes various software modules instructing the administrative computer 111 to execute the various tasks and processes described herein. Non-limiting examples of an administrative computer may include a laptop computer, a workstation computer, a tablet, a server, and the like. The administrative computer 111 may allow the administrator or end-user to define certain execution parameters of how the emulator devices 101 execute emulation routines. For example, like with some embodiments of the client device 107, an administrative computer 111 may be used expressly allocate resources of the emulation devices 101 to perform certain emulation routines. As another example, the administrative device 111 may be used submit or modify a netlist file to begin a new emulation. In a further example, in the event an emulation routine does not function as expected, the administrative computer 111 may be used to troubleshoot and reconfigure the emulation devices 101, and/or debug aspects of compiled code or netlist file.

In some embodiments, the administrative computer 111 may be proximate to the emulator devices 101 or logically internal to a network hosting the emulator devices 101. In such embodiments, the administrative computer 111 may be coupled to the emulator devices 101 through an I/O panel 103 using, e.g., an Infiniband connection. In some embodiments, the administrative computer 111 may not be proximate to the emulator device 101, or may be logically external to a computer network hosting the emulator devices 101 (e.g., outside of a firewall). In such cases, the administrative computer 111 may be connected to the emulator devices 101 through an I/O panel 103 using, for example, an Ethernet connection. Additionally or alternatively, in some instances, the administrative computer 111 may be integrated into the emulator devices 101 and/or I/O panel 103, thereby forming a single device for managing the systems that emulate logic system designs.

In many conventional solutions, complications may arise where domains are statically associated with target systems (e.g., target pods 105). Unlike such conventional solutions, the emulation system 100 comprises components capable of dynamically manipulating which domain executes the emulation routines for a given target system.

System Interconnectivity

The system 100 may comprise any number of network devices 109 configured to facilitate inter-device communications. Components of the emulation system 100 may be networked together through one or more means of connecting or networking computing devices. Accordingly, the system 100 may comprise any number of hardware and software components that facilitate networked communication over the related protocol. For example, emulation devices 101 physically housed within one cabinet may communicate with emulation devices 101 housed within a second cabinet, may communicate over an Infiniband. In this example, the system may comprise Infiniband cables, an Infiniband switch, and an I/O panel 103 capable of translating, sending, and receiving data packets using the Infiniband protocols. Additionally or alternatively, network devices 109 may be configured to facilitate communication using, for example, Ethernet, PCI buses, and the like.

Moreover, the emulator devices 101 of the system 100 may comprise one or more I/O panels 103 integrated into the emulator devices 101, and/or the emulator devices 101 may be coupled to one or more I/O panels 103 embodied in distinct devices. An I/O panel 103 may comprise any number of physical and logical interfaces configured to couple the emulation devices 101 to components of target systems, such as client devices 107 and target pods 105. As an example, a remotely located target pod 105 may connect to the emulator devices 101 over Ethernet, and thus the I/O interface panel 103 may be comprise an RJ45 port, and may be configured to communicate using TCP/IP protocols. Other non-limiting examples of the various physical and logical interface technologies that may be facilitated by the I/O panel 103 may include Infiniband and optical connections, among others.

Figure 2A:
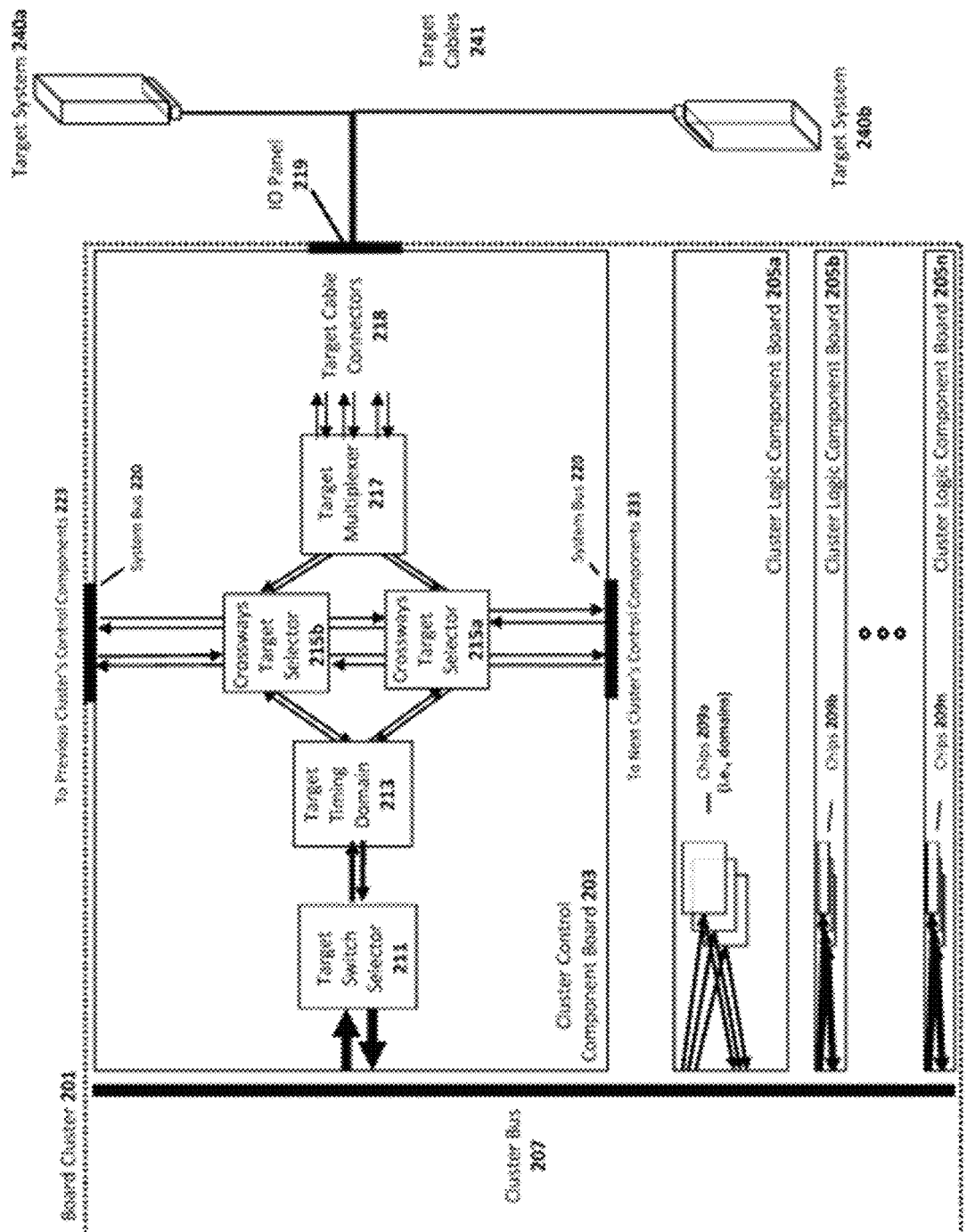
FIG. 2A shows greater detail of emulator devices and target devices of an emulation system.
Figure 2B:
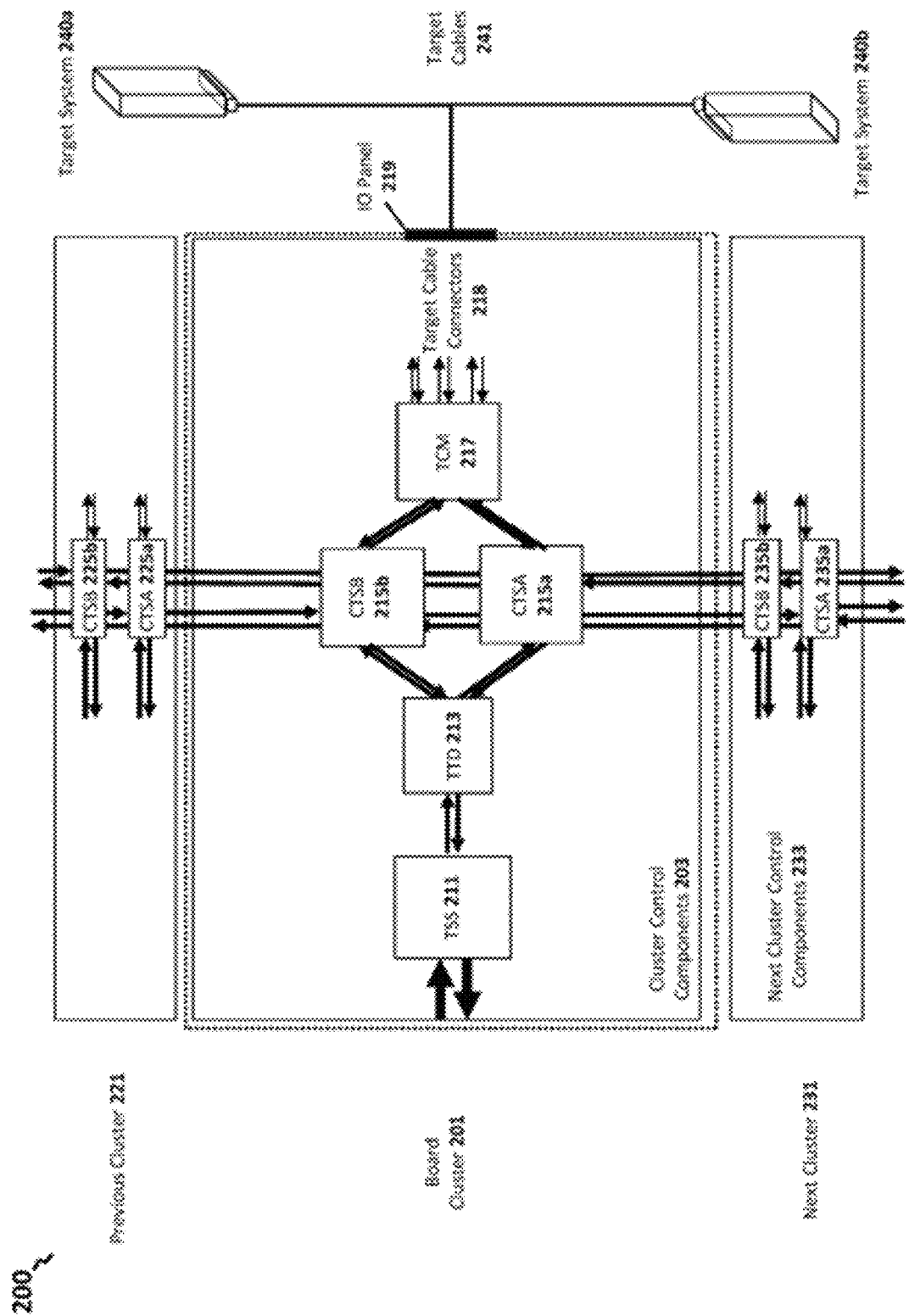
FIG. 2B shows greater detail of emulator devices and target devices of an emulation system.

FIG. 2A and FIG. 2B show greater detail of emulator devices and target devices of an emulation system 200, in accordance with previous approaches. In system 200, the emulator devices may be logically and physically organized into any number of board clusters 201, 221, 231. A cluster 201 may communicate data signals with one or more target pods 240 that connect a customer's target system to the various components of the emulation system 200. A I/O panel 219 comprising various interface components, connects target systems 240 to the emulation system 200.

Clusters of Logic Boards

As mentioned, logic boards of the system 200 may be organized into board clusters 201, 221, 231. A board cluster 201, as shown in FIG. 2A, may be a collection of circuit boards and related circuitry, including a control board 203, one or more logic boards 205, and one or more cluster buses 207. It should be appreciated that a cluster 201 is merely intended as a logical collection of components of an emulation system 200, and serves as an organizational module of components, to ease various processing overhead burdens on the components of the system 200. One having ordinary skill in the art would appreciate that an emulation system 200 might not be organized into any modular clusters, or might also be organized into any number of components into any number of clusters, at any level of abstraction. For example, chips 209 may or may not be organized into chip clusters; and similarly, chip clusters may or may not be organized together onto a logic component board 205.

A cluster 201 may have one or more cluster buses 207 comprising circuitry and/or wiring cables configured to transport data between components of the cluster 201. For instance, a cluster bus 207 may transport data between the control board 203 and a particular logic board 205 a. A cluster bus 207 may use any data communication protocols and hardware components capable of supporting the various data signals communicated between the components of the cluster 201. Non-limiting examples of a cluster bus 207 may include PCI, Infiniband, optical connections, and the like.

Similarly, emulation system 200 may comprise one or more system buses 220. A system bus 200 may comprise circuitry or wiring cables configured to transport data among clusters 201, 221, 231, or between target pods 204 and clusters 201, 221, 231. A system bus 220 may use any data communication protocols and hardware components capable of supporting data communications among clusters 201, 221, 231, and/or between target pods 240 and the clusters 201, 221, 231. Non-limiting examples of a system bus 220 may include PCI, Ethernet, Infiniband, optical connections, and the like.

Logic Boards

A cluster 201 may comprise any number of cluster logic boards 205. Logic boards 205 may be circuit boards comprising any number of logic components configured to execute the various emulation routines of a compiled netlist. In particular, logic boards 205 may contain any number of emulation chips 209. An emulation chip 209 may be an integrated circuit comprising one or more processors configured to execute the various processes of a particular emulation, according to an instruction set received from a compiler. In some cases, the chips 209 may be clustered into any number of chip clusters, each having one or more chips 209. In addition to having one or more emulation chips 209, logic boards 205 may comprise data lanes configured to transport data signals. Within a logic board 205 a, the data lanes may carry data signals between emulation chips 209 a of the board 205 a, and from the emulation chips 209 a of the logic board 205 a to a cluster bus 207.

Control Board and Control Components

A cluster control board 203 may be any circuit board comprising cluster control components, which may be a collection of one or more integrated circuits (e.g., ASIP, FPOA, PAL, FPGA, ASIC) configured to execute the various processes associated with managing and directing data communications in and out of the cluster 201, and among components of the cluster 201. More specifically, cluster control components on a cluster control board 203 may include a target switch selector 211, a target timing domain 213, one or more crossways target selectors 215, a target cable multiplexer (target MUX 217), and target cable connectors 218. Although system 200 shows a cluster control board 203 having each of the above-referenced cluster control components, it should be appreciated that some embodiments of an emulation system 200 may omit one or more of the herein described cluster control components or may include additional cluster control components.

In operation, cluster control components on the cluster control board 203 manage various aspects of how the cluster 201 executes the emulation routines and how the cluster 201 moves data bits around the system 200. In particular, the cluster control components may direct data, to and from, various components within the emulation system 200. For example, the cluster control components may direct data communications among cluster logic boards 205 a-n within the cluster 201, and among other board clusters 221, 231 within the system 200. As mentioned previously, the emulation system 200 may comprise any number of domains. Domains may be logical collections of components of the system 200, and the cluster control components may be responsible for controlling the inputs and outputs of data signals, to and from the domains of the system 200. In system 200, a domain may comprise one or more emulator chips 209 a within a particular logic component board 205 a. The domain may be associated with a particular emulation project received from a particular target system 240 a, and thus the one or more emulator chips 209 a of the domain may be configured to communicate data inputs and outputs with that particular target system 240 a. But in some circumstances, the cluster control components may be dynamically reconfigured to switch which target system 240 a, 240 b is associated with which domain. In such circumstances, the cluster control components may be initially configured at compile time to direct data signals between a first target system 240 a and an emulator chip 209 a of a domain, but then be reconfigured to direct data signals between a second target system 240 b and the emulator chip 209 a of the domain. Alternatively, in such circumstances requiring dynamic reconfiguration, the cluster control components could be reconfigured to direct data signals between the first target system 240 a and a second emulator chip 209 b of a second domain.

The cluster control components may comprise a target selector switch 211, which may be a multiplexer configured to connect and direct signals to and from cluster logic boards 205 of the cluster 201. The target selector switch 211 may select data (in each direction) for connection to target cables 218. These selected channels are then logically connected to a target timing domain 213.

The cluster control components may comprise a target timing domain 213, which may be a circuit (e.g., FPGA) configured to re-synchronize incoming signals from the cluster logic components 205, via the target selector switch 211, and may then link-up the signals with the target system 240 over a system bus 220, such as an optical cable link.

The cluster control components may comprise one or more crossways target selectors 215, which may be multiplexers that are situated on the cluster control board 203 between a target timing domain circuit 213, the target mux 217, and the system bus 220 that connects the cluster 201 to previous cluster 221 and a next cluster 231. In some embodiments, optical transceivers may manage the communications between the cluster 201 and the system bus 220, thereby managing the communication among the various cluster control boards 203, 223, 233. The crossways target selectors 215 may be configured to support rearranging target lanes among target connections 218 across the system 200.

The cluster control components may comprise a target multiplexer (target MUX 217). The target MUX 217 may be a multiplexer situated between domains (e.g., emulation chips 209) and target connectors 218, thereby logically coupling the target systems 240 to the emulation system 200. The target MUX 217 may be configured to dynamically change the communication connections among the domains and the target systems 240. In the exemplary system 200, the target MUX 217 may be situated on a cluster control board 203, between the crossways target selectors 215 and the target cable connectors 218, and may be configured to direct data communications between the crossways target selectors 215 and the target connectors 218. The target MUX 217 may allow a particular target system 240 associated with a particular domain to communicate with a different domain during runtime and thus executes as though the target system 240 was always associated with the different domain. Likewise, the target mux 217 may allow a particular domain (e.g., emulation chip 209 a) associated with a particular target system 240, to communicate with a different target system 240 during runtime, and thus executes as though the domain was always associated with the different target system 240. Similar to the capability of relocating domains and/or target systems 240, the target MUX 217 may also allow targets systems 240 associated with a particular cluster 201 to be relocated, to or from, another cluster 221, 231 in the system 200. Effectively, due to these advantageous relocation capabilities of the target MUX 217, target cables 241 coupling target systems 240 to a user IO panel 219 may directly or indirectly connect the target systems 240 to nearly any domain (e.g., emulation chip 209) of the board cluster 201 or emulation system 200. Each target system 240 may be dynamically associated with any number of domains (e.g., emulation chips 209). That is, rather than having fixed connections, a target MUX 217 allows the emulator system 200 to redefine which target connectors 218 communicate data to which domains, such that some or all of the target systems 240 may be connected to some or all of the domains of the system 200.

In operation, a target MUX 217 may be dynamically reprogrammable while the emulation system 200 is executing various emulation routines; this may be accomplished without disrupting the other, ongoing emulator routines. For instance, an ongoing emulation routine may be executed that connects a first chip 209 a of a first domain, and a first target system 240 a, which leaves available a second chip 209 b, of a second domain, and a second target system 240 b. A configuration manager module monitoring allocation and usage of resource may identify that the both the second chip and 209 b and the second target 240 b are available, even though they are both currently configured to communicate with the unavailable resources that are currently executing an ongoing emulation routine. The configuration manager may generate and distribute new instructions to one or more cluster control components, such as a target MUX 217, to redirect the data traffic for a new emulation routine involving the second chip 209 b of the second and the second target 240 b. In other words, a target MUX 217 may be dynamically reprogrammed to drive signals carrying data between the second chip 209 b of the second domain and the second target 240 b, even though the second chip 209 b and second target 240 b were previously configured to—according to their respective instruction sets communicate with different resources of the system 200. The target MUX 217 therefore dynamically connects the second chip 209 b of the second domain with the second target 240 b, without disrupting the ongoing emulation routine involving the first chip 209 a and the first target 240 a.

Connectivity Between the System and Target Systems

A user IO panel 219 may be connected directly to a cluster control board 203 or a cluster bus 207. In some embodiments, the user IO panel 219 may be connected to the cluster control board 203 via one or more system buses 220. As such, the user IO panel 219 may be directly or indirectly connected to any number of target MUXs 217, of any number of clusters 201, 221, 231. Coupled to the IO panel 219 may be any number of target cable connectors 218. Target cable connectors 218 may be hardware interfaces coupling a board cluster 201 or emulation system 200, to the user IO panel 219 or directly to target systems 240. In some embodiments, the target cable connectors 218 may be the interface components of the user IO panel 219. The target cable connectors 218 may be any hardware wiring and interfaces capable of transporting data between a target mux 217 and a target system 240. In operation, each target cable connector 218 may be associated with one or more addresses or pins of the target mux 217, such that the target mux 217 is instructed to select data from, or output data to, a particular address or pin, either by the target mux's 217 own instruction set or by an instruction received from another component of the system 200 (e.g., chip 209, target system 240).

The target cable connectors 218 and the IO panel 219 may comprise any number of ports and interfaces configured to transport data to target systems 240 through the target cables 241 physically coupling the target systems 240 to the IO panel 219. For example, a target system 240 a may comprise a target pod that communicates through Ethernet to the system 200. In this example, the target cables 241 may comprise any number of Ethernet cables (e.g., Cat 5 cables), that couple to an RJ45 interface of the IO panel 219. The target cable connectors 218 may comprise any number of logical and physical interfaces configured to convey data signals to and from the target MUX 217. Then, operating in accordance with the instruction set of the target MUX 217, the target MUX 217 may select inputs from a port or pin associated with that target system 240 a to drive the signals to a particular domain, or may drive outputs through the port or pin associated with the target system 240 a to the target pod of the target system 240 a.

Serial Management System

Figure 3:
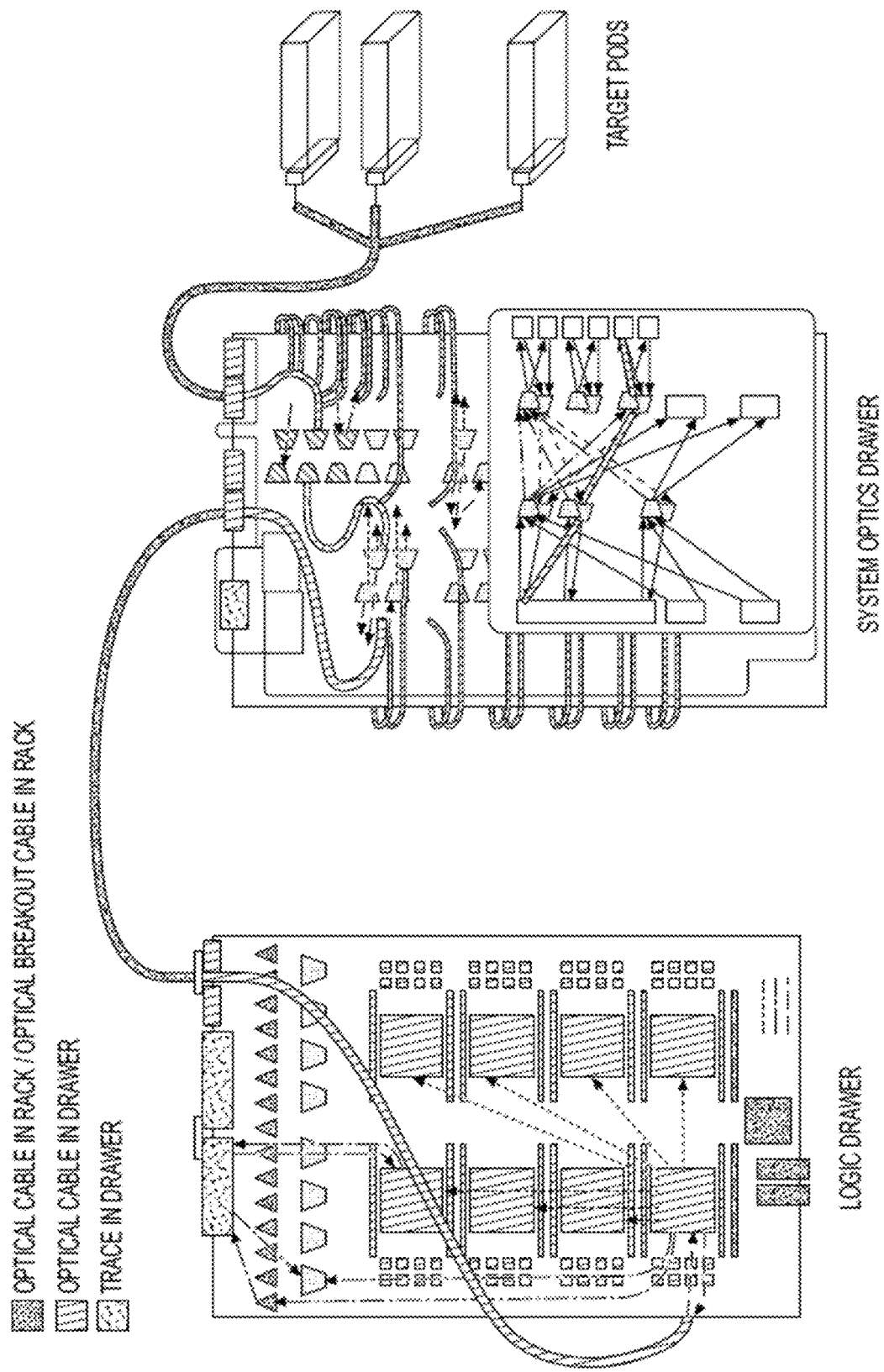
FIG. 3 shows a diagram depicting a logic drawer, system optics drawer and target devices of an emulation system consistent with embodiments of the present invention.
Figure 4:
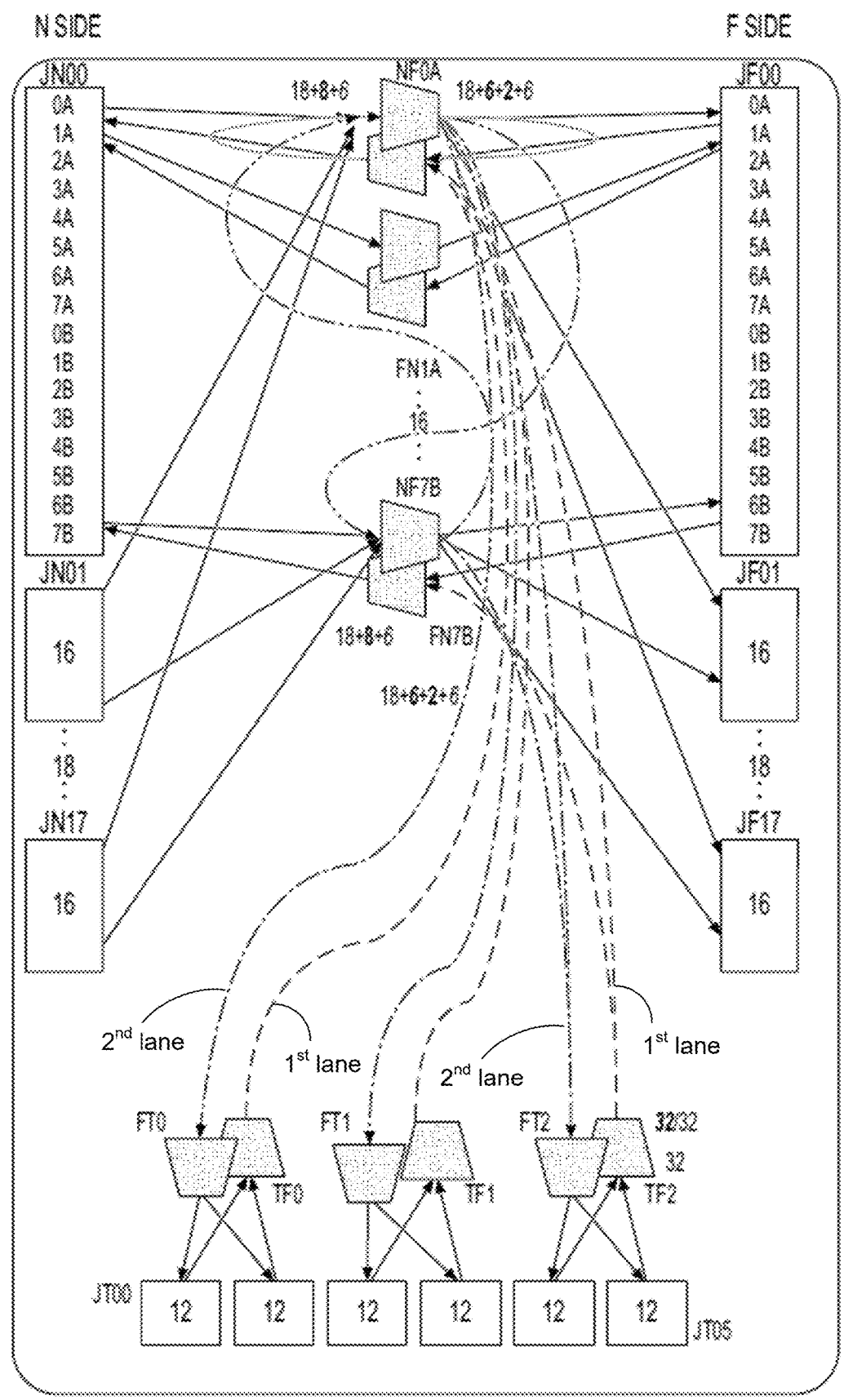
FIGS. 4-5 show diagrams depicting interconnection examples of an emulation system consistent with embodiments of the present invention.
Figure 5:
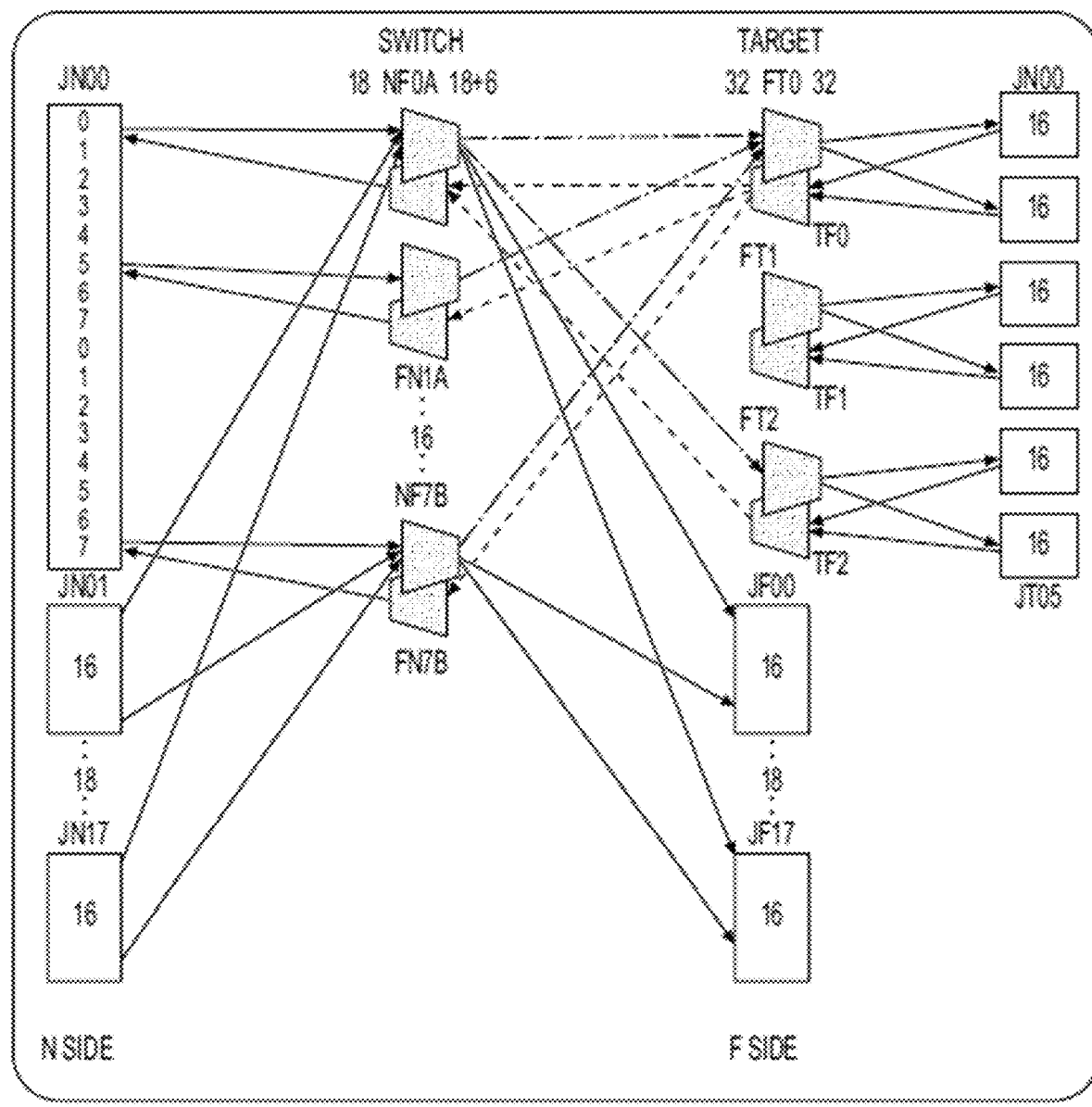

Referring also to FIGS. 3-5, embodiments consistent with the multi-user emulation system of the present invention are provided. In the diagrams shown in FIGS. 2A-2B, a set of serial switches (211, 215*a*, 215*b*, and 217) are used to direct serial lanes from dedicated pins on the domain (e.g., through the backplane to the cluster control drawer and then to the target pod). These switches are also capable of directing the lanes to other cluster control drawers to connect to other target pods connected to those drawers (e.g., cross cluster path: 215*a*→225*a* and 235*a*; 215*b*→225*b* and 235*b*).

In contrast, and as shown in FIGS. 3-5, embodiments of the present disclosure are provided depicting an exemplary logic drawer, system optics drawer ("SOD"), and a plurality of target pods. Various optical cables may be used in the rack, in the drawer and an optical breakout cable may be used in the rack as shown in FIG. 3. It should be noted that these figures are provided merely by way of example as numerous other configurations and arrangements are also within the scope of the present disclosure.

In some embodiments, the system may be configured to share the rack-switch-rack connections and steal and/or reuse them to direct signals from each logic drawer to a second set of "target switches" that connect to all of a rack's target pods. In this way, only cluster 0 (in each rack) may be used and cables (18), as shown in FIG. 4, from each logic drawer may be directed to the secondary target switches and then on to the target pod.

FIGS. 4-5 depict examples of the same interconnect inside each system optics drawer (which may be similar in function to the cluster control drawer in the examples of FIGS. 2A-2B above). However, the embodiments of FIGS. 4-5 further include a rack-rack cabling "interconnect switch" which may be configured to re-direct data signals from near cables to far cables. It should be noted that this particular interconnect scheme is merely intended to provide one particular example that may illustrate the interconnected nature of the emulation chips and lanes.

For example, and focusing in on the rack-rack switching from the "near" side (from the 18 logic drawers in this rack) to the "far" side (18 logic drawers spread across other racks in the multi-rack system) as shown in FIG. 4. In this example, the 32-lanes from the 18 near cables may be divided into 32 switch chips that may drive and/or receive from the 32-lanes on the 18 far cables. The target lanes may be tapped off of each of these switch chips (both TX and RX) to go to/from the target pods (bottom). The first and second lanes may be configured to spread across the target switch and may be used to relocate the target. This configuration may be used in lieu of the serial switches shown in FIGS. 2A/2B. FIG. 5 depicts an example showing the same "interconnect switch" (embedded in each system optics drawer), re-arranged to highlight the "flow" to and from target pods. Note that the target switch exists in each system optics drawer, but are only used in SOD0 of each rack.

Exemplary Method

In some embodiments, the target system and the emulation system may communicate data signals via a target pod. But it should be appreciated that a distinct, target pod device is not required in all embodiments. In some embodiments, each domain may comprise a single emulation chip. However, as previously mentioned, domains may be the smallest unit of resources the emulation system is capable of allocating to a particular emulation. So it should be appreciated that a domain may comprise and be defined by any number of resources of the emulation system, at any level of hierarchical level of execution. Other non-limiting examples of domains may include one or more processors residing on an emulation chip; a plurality of emulation chips; whole logic boards comprising clusters of chips; clusters of logic boards; and so forth. In many cases, domains—e.g., the smallest unit of components that may be allocated to an execute aspects of an emulation—may be defined by the capability of the configuration manager to schedule independent execution of an emulation's routines for that set of components. For example, in some embodiments, each domain may comprise an emulation chip because the emulation system is capable of allocating and scheduling each respective emulation chip to execute the emulation routines for an emulation of a target system, independently from the other emulation chips and independently from a system clock.

Prior to emulation testing, engineers may prepare a netlist file representing a logic system that is under development and/or requires testing. The netlist file may be provided to the emulation system in any number of ways. For example, an engineer may transmit the netlist file over one or more public or private networks to the emulation system, from client device operated by the engineer. In another example, the engineer or administrator of the emulation system may directly input the netlist file into an administrative computer or integrated user interface, able to configure, monitor and control the emulation system. Upon receiving the netlist file, software modules of the emulation system may compile the netlist file into machine-readable instructions for the various processors and multiplexers of the system. In some cases, the emulation system may automatically execute the emulation processes as described in FIG. 6 below; and in some cases, the emulation system may wait for various data inputs, operational configurations, and/or instructions from the user interfaces of client devices and/or administrator devices, before executing the emulation processes as described in FIG. 6.

Figure 6:
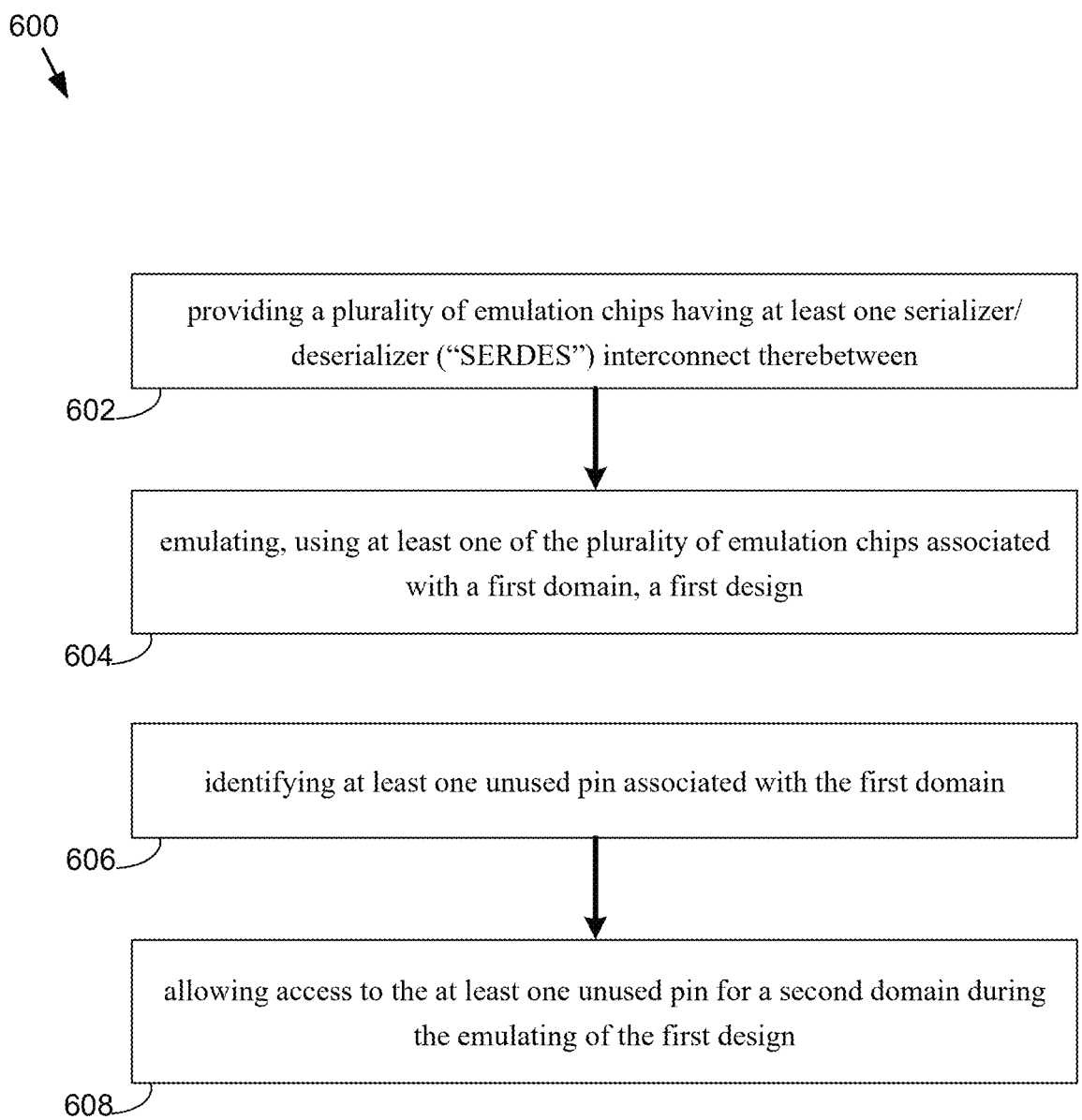
FIG. 6 shows operations consistent with an emulation process, according to an exemplary embodiment.

Referring now to FIG. 6, a flowchart depicting an embodiment consistent with emulation process included herein is provided. The method may include providing (302) a plurality of emulation chips having at least one SERDES interconnect therebetween. The method may further include emulating (304), using at least one of the plurality of emulation chips associated with a first domain, a first design and identifying (306) at least one unused pin associated with the first domain. The method may also include allowing (308) access to the at least one unused pin for a second domain during the emulating of the first design. Numerous other operations are also within the scope of the present disclosure.

As discussed above, most systems today simply take it offline and initialize and test the interconnect at power-up. Another partial solution, used in some systems today, is to reinitialize the SERDES when a design is downloaded. However, this may add unwanted delays during the user's download operation to bring up the lanes. However, these do not address the initial verification testing which may be required at the initial power-up to validate that the connections are good before a user attempts to run a design. This initial verification testing may take several hours today, resulting in a board replacement taking at least 8-12 hours depending on the system size (or more in larger systems). Some systems may allow testing to occur in parallel with jobs, but cannot share lanes with domains that are being used, so must take over any domains that connect directly to the new board. It is possible to test some of the lanes (e.g., free and test a first set of domains) and then test a second group of lanes (e.g., release the first and free a second set of domains), but this still requires one set or the other to be offline and generally takes twice as long (testing time varies only slightly with the number of lanes being tested). The result is any individual drawer maintenance still takes most or all of the system offline to reinitialize and test the interconnect, as it connects to many or all of the other boards in the system.

Accordingly, embodiments of the present disclosure include various modifications to the emulation hardware and control infrastructure to allow another process to access the unused lanes on domains that are "in use" running a job, and we created a new process to manage the serial lanes. In this way, when a new board powers up, the serial management process included herein may be configured to recognize the new domains, holds them offline until it can reinitialize and test the newly added SERDES lanes.

In some embodiments, the serial management process may be configured to access individual lanes to and from other domains in the system, even on domains that may be allocated to a job and in use running designs.

In some embodiments, the ASIC circuitry and management process may be specifically designed to ensure that there is no interference in domain operations or in any of the other "in-use" lanes in the domain.

In some embodiments, the serial management process may operate independent of jobs and may be queried by jobs as to lane status. Accordingly, embodiments included herein may be used to test and/or reinitialize lanes as necessary to recover bad lanes (e.g., retry it) before the jobs use them. The result is any individual drawer maintenance need not take any of the rest of the system offline to reinitialize and test its interconnect, regardless of where it connects.

In some embodiments, the serial management process may include hardware modifications that differ from those of existing systems. For example, register access to SERDES may be directly mapped, without requiring page registers to complicate multi-user access. Additionally and/or alternatively, macro-level resets (e.g., those affecting multiple SERDES) may be asserted automatically at power-up on all lanes, so they do not need to be asserted later when a reset on an unused lane would affect an operating lane. In some embodiments, register blocks for individual lanes may be arranged separately to simplify code access to unused lanes without affecting settings on operating lanes. Domain allocation to jobs may be performed using any suitable approach such as those described above. In one particular implementation this may be achieved using Infiniband, though this implementation is provided merely by way of example. In this way, Infiniband structures may be modified to allow "unowned" access to domains owned by another job.

In some embodiments, the serial management process may provide the ability to monitor lanes and collect telemetry at all times regardless of whether the lanes/domains are being used or not. Additionally and/or alternatively, any telemetry information may be used for further tuning of the system. For example, a health check monitoring routine may use this data to evaluate the long term reliability of specific SERDES lanes and feed this information to the compiler and runtime to enhance the availability of the system by job relocation.

Referring also to FIGS. 7-16 a non-exhaustive listing of examples of different serial topologies that may be used in accordance with the serial management process described herein are provided. As shown in the Figures, the serial manager may be configured to handle many different lane topologies and end points. These examples may include, but are not limited to, optical paths, emulation chips (e.g., Sd & Su), FPGAs, SIMD fixed-point ("SFP") adapters, retimers, etc. Various loss and delay parameters may also be addressed and included.

Figure 7:
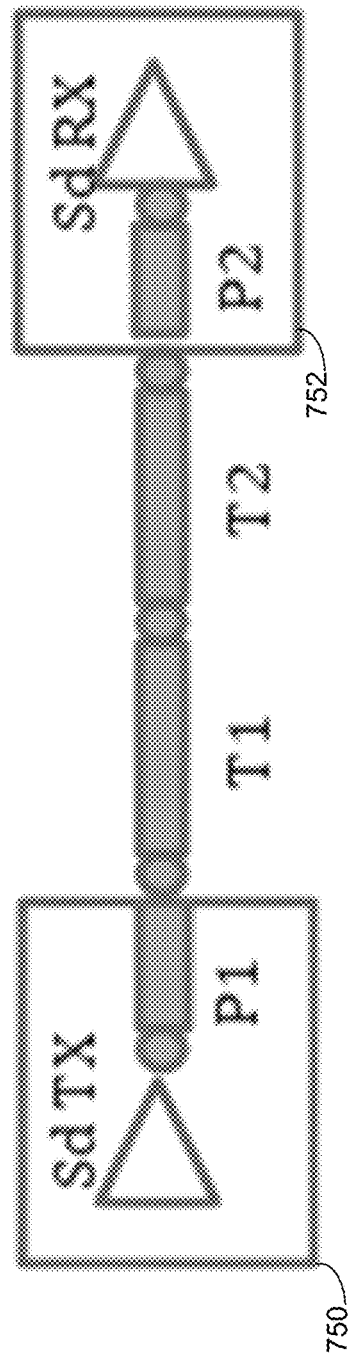
FIGS. 7-16 show various diagrams depicting non-exhaustive examples of serial topologies according to embodiments of the present disclosure.
Figure 8:
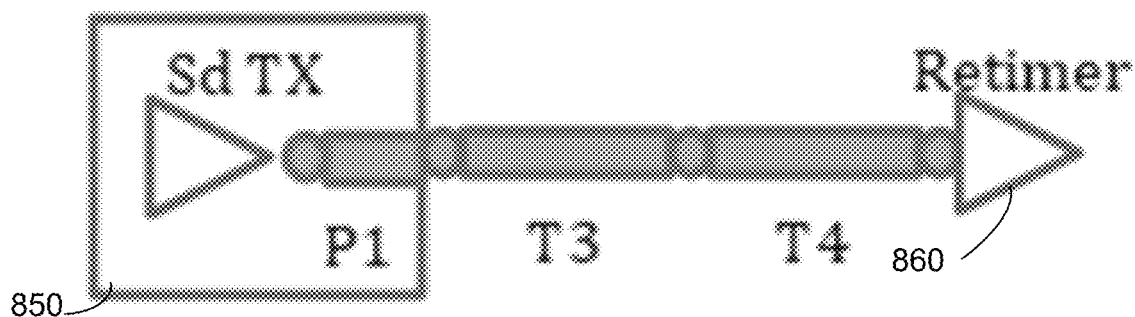
Figure 9:
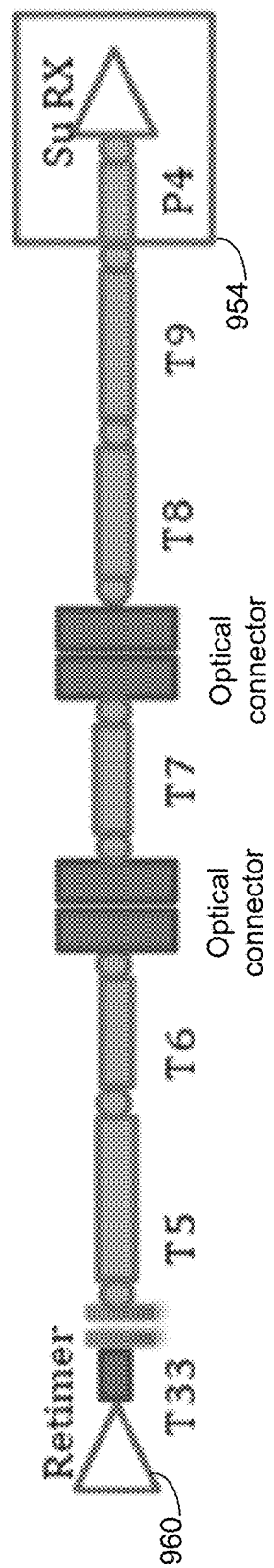
Figure 10:
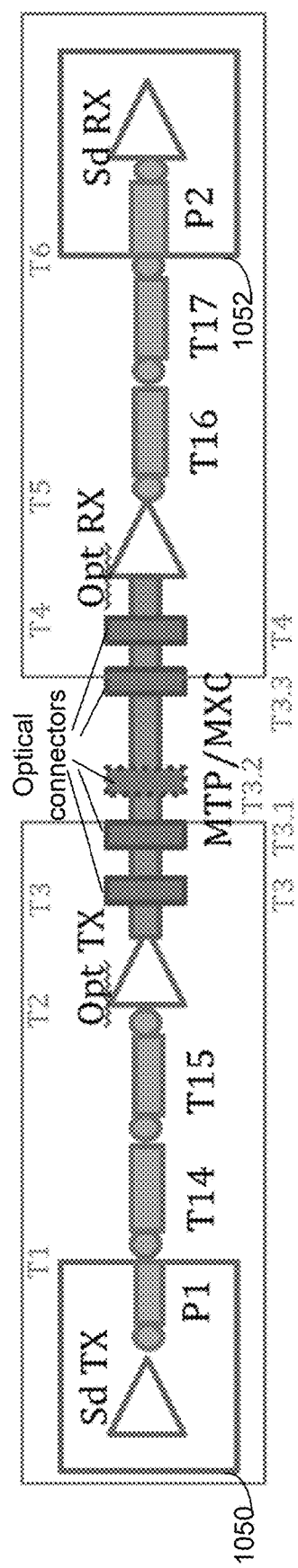
Figure 11:
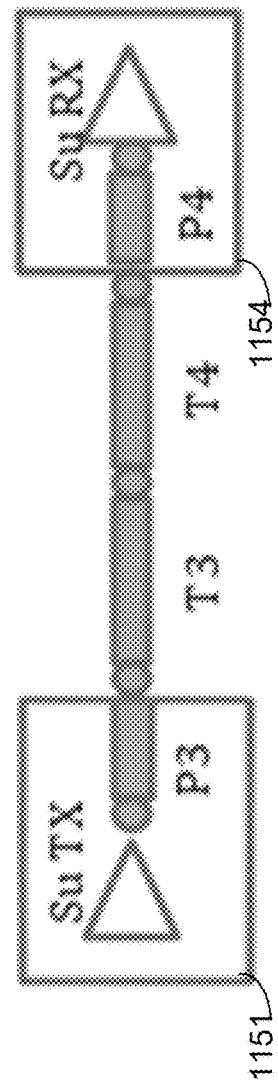
Figure 12:
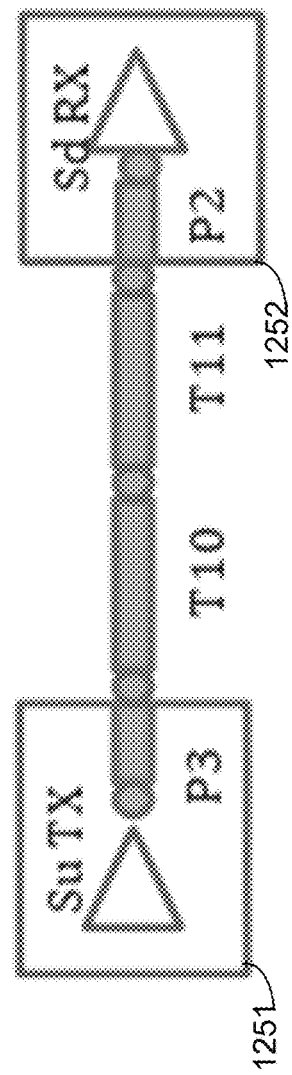
Figure 13:
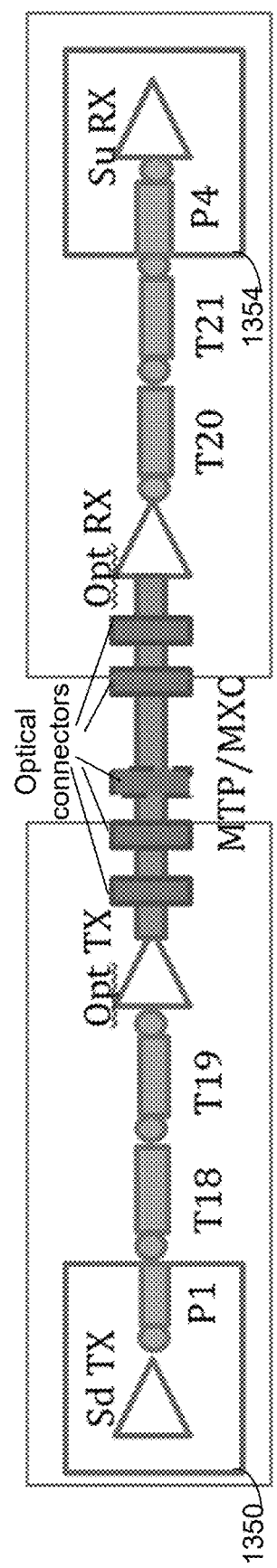
Figure 14:
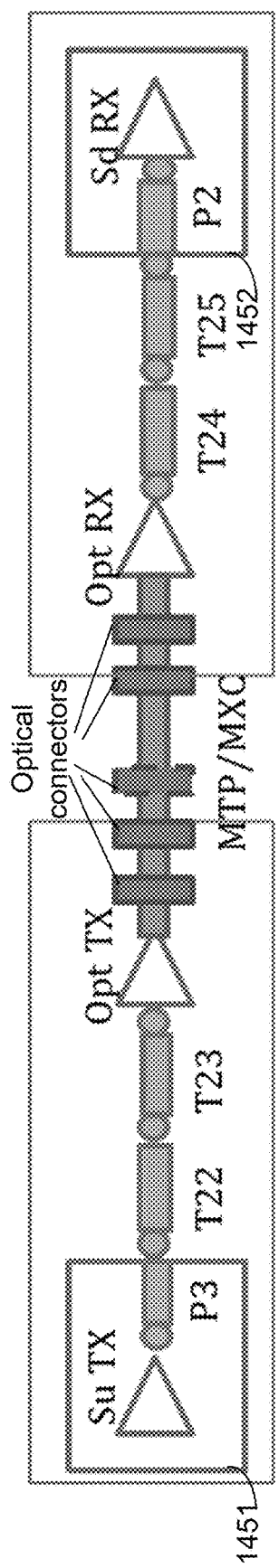
Figure 15:
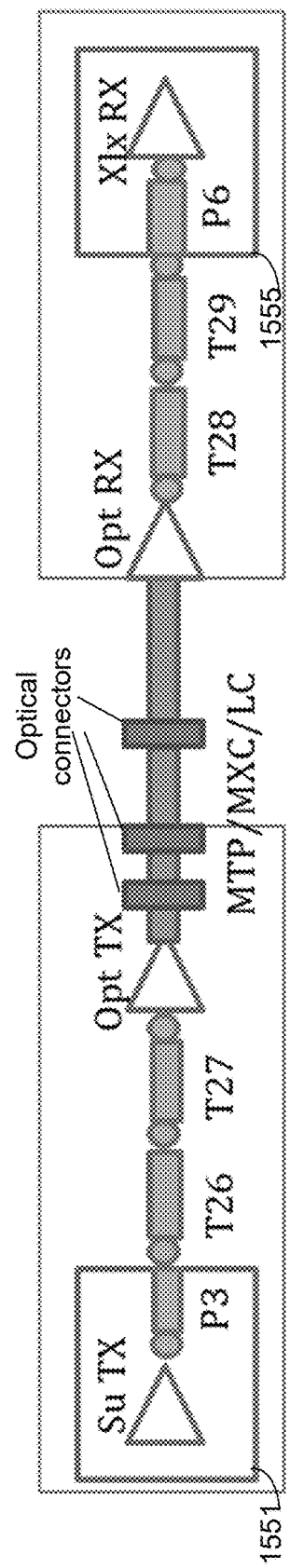
Figure 16:
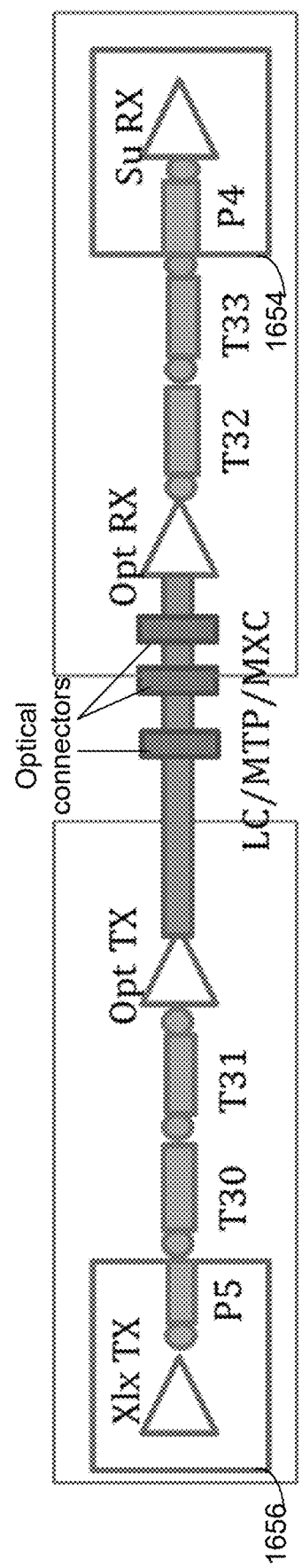

FIG. 7 depicts an example serial topology 700 showing emulation chips 750, 752 corresponding to a transmitter and receiver. Interconnections are showed therebetween. FIG. 8 depicts an example serial topology 800 showing emulation chip 850 and retimer 860. FIG. 9 depicts an example serial topology 900 showing retimer 960 and emulation chip 954. This particular topology also includes numerous optical connectors along the interconnection path. Similarly, FIG. 10 depicts another example serial topology 1000 showing emulation chips 1050, 1052 having optical connectors included therebetween. FIGS. 11-12 depict additional examples showing emulation chips and their interconnections. FIGS. 13-16 depict further examples of topologies that include numerous optical connectors along the interconnection path. These topologies are provided merely by way of example as numerous other configurations may also be used without departing from the scope of the present disclosure.

In some embodiments, the serial management process may include software modifications that differ from those of existing systems. For example, domain allocation to jobs may be handled using Infiniband or any other suitable approach. In the Infiniband example, Infiniband structures originally were used to isolate jobs from one another (e.g., memory management techniques to restrict access). These were modified to allow "unowned" access to domains owned by another job so that serial management can access "unused" lanes in allocated and operating domains.

In some embodiments, the separate independent serial management process may be started at system power-on and may be configured to watch for boards powering on. When detected, the process may keep them unavailable for jobs until it may initialize and test all newly usable lanes automatically. Accordingly, the serial management process described herein is specifically designed to avoid interference with runtime operations, unless specifically requested to operate on lanes and domains by runtime owners. As such, runtime only polls the serial management on the status of the lanes (rather than test them directly, as done by prior approaches).

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for use with a multi-user emulation system comprising:
   providing a plurality of emulation chips having at least one serializer/deserializer ("SERDES") interconnect therebetween;
   emulating, using at least one of the plurality of emulation chips associated with a first domain, a first design;
   identifying at least one unused pin associated with the first domain;
   allowing access to the at least one unused pin for a second domain during the emulating of the first design;
   recognizing the second domain having at least one additional SERDES interconnect associated therewith; and
   testing the at least one additional SERDES interconnect prior to emulating the second design.

2. The method of claim 1, further comprising:
   simultaneously emulating a second design and the first design.

3. The method of claim 1, further comprising:
   providing the first domain with access to the plurality of SERDES interconnects associated with the second domain.

4. The method of claim 1, further comprising:
   directly mapping register access to the at least one SERDES interconnect without using a page register.

5. The method of claim 1, further comprising:
   automatically asserting a macro level reset on the at least one SERDES interconnect.

6. The method of claim 1, wherein recognizing the second domain includes identifying at least one board has been activated.

7. The method of claim 1, further comprising:
   performing system maintenance during the emulating of the first design.

8. The method of claim 1, wherein one or more register blocks for each of the at least one SERDES interconnect are separated.

9. A multi-user circuit emulation system comprising:
   one or more domains of system components, each respective domain comprising one or more processors of the emulation system, each respective processor configured to execute one or more processing jobs according to an instruction set executed by the respective processor;
   a system manager module configured to:
   control an emulation associated with a first domain;
   identify at least one unused pin associated with the first domain; and
   allow access to the at least one unused pin for a second domain during the emulation of the first design, wherein the system manager module is further configured to recognize the second domain having at least one additional SERDES interconnect associated therewith and wherein the system manager module is further configured to test the at least one additional SERDES interconnect prior to emulating the second design.

10. The circuit emulation system of claim 9, wherein the system manager module is further configured to simultaneously emulate a second design and the first design.

11. The circuit emulation system of claim 9, wherein the system manager module is further configured to provide the first domain with access to the plurality of SERDES interconnects associated with the second domain.

12. The circuit emulation system of claim 9, wherein the system manager module is further configured to directly map register access to the at least one SERDES interconnect without using a page register.

13. The circuit emulation system of claim 9, wherein the system manager module is further configured to automatically assert a macro level reset on the at least one SERDES interconnect.

14. The circuit emulation system of claim 9, wherein recognizing the second domain includes identifying at least one board has been activated.

15. The circuit emulation system of claim 9, wherein the system manager module is further configured to perform system maintenance during the emulating of the first design.

16. The circuit emulation system of claim 9, wherein one or more register blocks for each of the at least one SERDES interconnect are separated.

* * * * *